United States Patent [19]

Guillaume et al.

[11] Patent Number: 5,274,027
[45] Date of Patent: Dec. 28, 1993

[54] MONOVINYLIDENE AROMATIC AND CONJUGATED DIENE COPOLYMER COATING COMPOSITIONS COMPRISING SULFOALKYL MONOMERIC EMULSIFIER

[75] Inventors: Jean-Luc Guillaume, La Wantzenau, France; Stephen M. Oliver, Horgen, Switzerland; Chiu-Kwan Lam, Achern, Fed. Rep. of Germany

[73] Assignee: The Dow Chemical Company, Midland, Mich.

[21] Appl. No.: 813,639

[22] Filed: Dec. 26, 1991

Related U.S. Application Data

[63] Continuation of Ser. No. 503,196, Apr. 2, 1990, abandoned.

[30] Foreign Application Priority Data

Apr. 4, 1989 [GB] United Kingdom ............... 89007534

[51] Int. Cl.$^5$ ................................................. C08K 3/00
[52] U.S. Cl. .................................. 524/814; 428/537.5; 524/817; 526/240; 526/287
[58] Field of Search ............... 526/287, 240; 524/814, 524/817

[56] References Cited

U.S. PATENT DOCUMENTS

| | | | |
|---|---|---|---|
| 2,914,499 | 11/1959 | Sheetz . | |
| 3,033,833 | 5/1962 | Le Fevre | 526/287 |
| 4,436,875 | 3/1984 | Janiga | 525/385 |
| 4,661,557 | 4/1987 | Bubam | 524/770 |

FOREIGN PATENT DOCUMENTS

| | | |
|---|---|---|
| 0295402A2 | 12/1988 | European Pat. Off. . |
| 842563 | 7/1960 | United Kingdom . |
| 2049711 | 12/1980 | United Kingdom . |

*Primary Examiner*—Christopher Henderson

[57] ABSTRACT

It has been found that monovinylidene aromatic/conjugated diene/ethylenically unsaturated acid copolymer compositions are provided with good combinations of physical properties when a sulfoalkyl monomer is employed in minor amounts in such polymer in place of emulsifying additive(s). In particular, the combinations of wet and dry pick resistance have been shown to be maintained or improved when paper coating formulations are prepared from latex polymer compositions according to this invention. Sulfoalkyl (meth)acrylate salts and 2-acrylamido-2-methylpropane sulfonic acid salts are shown to be suitable sulfoalkyl monomers for this purpose.

5 Claims, No Drawings

MONOVINYLIDENE AROMATIC AND CONJUGATED DIENE COPOLYMER COATING COMPOSITIONS COMPRISING SULFOALKYL MONOMERIC EMULSIFIER

CROSS-REFERENCE TO RELATED APPLICATION

This is a continuation of application Ser. No. 503,196, filed Apr. 2, 1990, now abandoned.

BACKGROUND OF INVENTION

This invention relates to improved coating compositions based on monovinylidene aromatic, conjugated diene and acid monomers further comprising an emulsifying, sulfoalkyl monomer polymerized therein. Preferably, these are latexes prepared by an aqueous dispersion polymerization process.

Latexes or aqueous dispersions of polymers of monovinylidene aromatic and conjugated diene monomers find wide spread usage as coating materials, particularly in the area of paper coatings. It is well known in the art that emulsifiers or surfactants must be added to achieve stable, aqueous dispersions of these polymeric materials. However, such additives tend to cause foaming problems in the latex production process and to reduce the moisture resistance of the coatings that are prepared with the latex polymers. It is also known that certain monomers having hydrophilic moieties can be used in preparing the polymer and will assist in emulsifying and stabilizing it in an aqueous dispersion. See, for example U.S. Pat. No. 3,033,833 and GB 2,175,594. In these references sulfoalkyl monomers are used to prepare latex polymers. It has been found, however, that the polymers of the type described will typically decrease in moisture resistance if the latex stability is improved and vice-versa. It has also usually been found that when used in paper coating formulations, improvements in wet pick resistance are only obtained with an accompanying loss of dry pick resistance or vice versa.

It is an object of the present invention to provide polymer compositions based on monovinylidene aromatic and conjugated diene monomers which have good stability in aqueous dispersion form and have good adhesion to substrates and/or fillers under conditions of impact and shearing forces, even in the presence of moisture. When such polymers are used in paper coatings these qualities are particularly important and provide the coating with good resistance to wet and dry "picking" of the paper coating. It is another object to provide aqueous polymer dispersions suitable for use in preparing paper coating formulations having the above desirable properties. It is a further object to provide the paper coating formulations, paper coatings and coated paper articles that can be prepared.

SUMMARY OF INVENTION

In this regard, polymer compositions are prepared according to the present invention providing improved combinations of stability when in the form of an aqueous dispersion and physical properties when in the form of a dried coating or film. In one aspect the present invention is a polymer composition comprising in polymerized form (a) from 30 to 90 parts by weight of at least one monovinylidene aromatic monomer, (b) from 8 to 65 parts by weight conjugated diene monomer(s), (e) from 0.1 to 25 parts by weight of at least one ethylenically unsaturated carboxylic acid and (d) from 0.1 to 5 parts by weight of at least one sulfoalkyl surfactant monomer of the formula I:

wherein A is a bivalent radical of formula Ia and Ib:

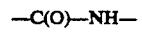 Ia, or

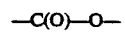 Ib, $R_1$ is —H or a methyl radical, $R_2$ is a bivalent hydrocarbyl radical having 1 to 5 carbon atoms and M is a salt-forming cation, said weight parts being based on (a), (b), (e) and (d).

In another aspect the invention is also an improved aqueous copolymer dispersion providing improved coating formulations and coatings. In a further aspect, the invention relates to improved coatings, coating formulations and coated objects.

DETAILED DESCRIPTION OF INVENTION

The polymers according to the present invention can be prepared by polymerization processes which are generally known in the art, and particularly by the known latex polymerization processes. Representative latex polymerization processes include those described in U.S. Pat. Nos. 3,575,913 and 3,563,946 and British Patent 1,245,166. Such processes can be adapted as necessary to polymerize the polymers of the above described monomers based on the generally known principles of latex polymerization. The well known latex polymerization aids such as initiators, chain transfer agents, crosslinking agents, surfactants, emulsifiers, seed latex materials and the like can be used as needed.

The polymerizable sulfoalkyl surfactant or emulsifying monomer(s) which are suitable for use according to the present invention are represented by the formula:

wherein A is a bivalent radical of formula Ia or Ib:

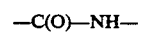 Ia, or

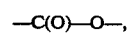, Ib, $R_1$ is —H or a methyl radical, $R_2$ is a bivalent hydrocarbyl radical having 1 to 5 carbon atoms and M is a salt-forming cation. These monomers are generally known in the art. See for example U.S. Pat. Nos. 3,033,833 and 3,617,368 and British Patent 2,175,594.

The use of these monomers in the specific polymer compositions according to the present invention as defined above has been shown to produce aqueous dispersed polymers which have excellent combinations of stability in aqueous dispersion form and coating properties as compared to the coating compositions which are currently known. The sulfoalkyl (meth)acrylates (wherein A in Formula I is represented by Formula Ib) are preferred sulfoalkyl monomers. It has been found especially preferable to use sulfoalkyl methacrylate monomers according to Formula I (wherein $R_1$ is a methyl radical) wherein $R_2$ has 1 to 3 carbon atoms.

Sulfoethyl methacrylate (SEM) and sulfopropyl methacrylate (SPM) are preferred examples of such compounds.

When A of formula I is represented by formula Ia, it is especially preferable to use a sulfoalkyl monomer such as 2-acrylamido-2-methylpropanesulphonic acid (AMPS) wherein $R_2$ is a 2-methyl propyl group bonded to A from the second carbon of the propyl group, the first carbon being bonded to the sulfonate radical. Regarding M, ammonium or the alkali and/or alkali earth metals are preferred salt forming cations, with ammonium, sodium, potassium, or calcium being especially preferred.

These sulfoalkyl surfactant monomers should be used in minor amounts of from 0.1 to 5 weight parts based on the monomers used to form the main portion of the polymer, Components (a), (b), (c) and (d) described above. It has been found preferable to use from 0.3 to 3 weight parts, more preferably from 0.5 to 3 weight parts, and most preferably from 1 to 2 weight parts.

In preparing the base polymer composition, one or more of the monovinylidene aromatic monomers which are generally known in the art are used. As used herein, the term monovinylidene aromatic monomer refers to compounds represented by the formula II below:

$$Ar—C(R_3)=CH_2 \qquad II$$

wherein Ar is phenyl or phenyl substituted with halogen and/or one more hydrocarbyl radical(s) having 1 to 4 carbon atoms and $R_3$ is —H or a 1- to 4-carbon alkyl group. Preferred examples of such monomers include styrene, alpha methyl styrene and ortho-, meta- and/or para-vinyl toluene, with styrene being the most preferred monovinylidene aromatic monomer.

The polymer compositions according to the present invention also comprise in polymerized form one or more of the conjugated diene monomers. These monomers are well known for use in latex polymerizations and include 1,3-butadiene, isoprene, chloroprene and 2,3-dimethyl-1,3-butadiene. 1,3-butadiene is the preferred conjugated diene monomers for use in the present invention. The polymers according to the present invention also contain polymerized therein a minor amount of at least one ethylenically unsaturated carboxylic acid monomer. This includes the well known polymerizable mono- or difunctional acid monomers such as itaconic, fumaric, maleic, crotonic, acrylic and/or methacrylic acids (including the half esters of the dibasic acids), the use of which in latex polymerizations is generally well known. In general the acid monomer can be incorporated in amounts of from 0.1 to 25 weight parts, preferably from 0.5 to 10 weight parts and most preferably from 0.75 to 5 weight parts, based upon monomers (a), (b), (c) and (d) as described above. It has been found that the use of itaconic or methacrylic acids in combination with the sulfoalkyl monomer provides good mechanical stability for the aqueous dispersions over a range of pH conditions while the coatings prepared from the latex unexpectedly provide improved paper coatings.

The monovinylidene aromatic and conjugated diene monomers are selected and used in amounts necessary to prepare the desired coating polymer in terms of Tg and other physical properties. This polymer is then given surprisingly improved dispersion stability and physical properties by the copolymerization therewith of the acid and sulfoalkyl monomers. In general, it is preferable to select the monovinylidene aromatic and diene monomers such that their resultant polymer composition would have a glass transition temperature (Tg) of between $-20°$ C. and $+90°$ C., preferably between $-10°$ C. and $+50°$ C., more preferably between $+5°$ C. and $+40°$ C., as measured by differential thermal analysis.

In preparing this polymer, the monovinylidene aromatic monomer(s) are typically used in amounts of 30 to 90, more preferably 40 to 80, and most preferably 60 to 80 parts by weight; the conjugated diene(s) in amounts of 8 to 65 preferably 15 to 55, more preferably 20 to 60, and most preferably 20 to 40 parts by weight; and the ethylenically unsaturated carboxylic acid(s) in amounts of 0.1 to 25, more preferably 0.5 to 10, and most preferably 0.75 to 5 parts by weight. These weight parts are based upon the monovinylidene aromatic, conjugated diene, acid and sulfoalkyl monomers in the final polymer.

It is also possible to include additional, minor amounts of one or more ethylenically unsaturated monomer in the preparation of the polymers according to the present invention as partial replacement for the hardening monovinylidene aromatic monomer. Such monomer(s) could include lower alkyl esters of acrylic or methacrylic acid, such as methyl (meth)acrylate; unsaturated aliphatic nitriles, such as acrylonitrile or methaerylonitrile; and/or vinyl and/or vinylidene chloride. A part of the softening conjugated diene monomer can also be replaced with one or more of the alkyl esters of acrylic acid, such as ethylacrylate, butylacrylate or ethylhexyl acrylate, that provide a similar softening effect.

However, these monomers can be used only in minor amounts as partial replacement of the monovinylidene aromatic and/or conjugated diene monomers, i.e., there is generally less than 50 percent replacement of these monomers, preferably less than 20 percent and most preferably less than 10 percent. The monomers selected for the preparation of the polymers according to the present invention should in all cases provide a resultant polymerized composition having a glass transition temperature as specified above.

Within the above specified requirements for latex stability, coating properties and polymer Tg it is also sometimes possible to use additional monomeric modifiers such as unsaturated amides, including acrylamide, and hydroxyalkyl (meth)acrylates including hydroxyethyl acrylate.

As compared to paper coating compositions and paper coatings prepared from the standard polymeric coating materials, the toughness and water resistance of the coating materials according to the present invention are very advantageous in view of the treatments which the coated paper receives in offset and other printing processes.

Depending on the intended use of the polymer composition prepared according to the present invention various other additives and ingredients known to those skilled in the respective arts can be incorporated to prepare coating compositions. It should be noted, however, that the additional surfactants and/or emulsifiers typically required for using the known polymeric coating materials are either unnecessary or can be reduced greatly in amount to achieve similar levels of dispersion stability.

Typical ingredients for paper coatings, also called coating colors, could include pigments such as kaolin, calcium carbonate, talc, gypsum, titanium dioxide, montmorillonite, and/or bentonite; dispersing agents such as polyacrylate, pyrophosphate, and/or hexamethylphosphate; defoamers; optical brightening agents; release agents; cobinders; and/or synthetic thickeners.

The objects which may be coated with the polymer compositions of this invention include paper and paperboard. Methods for coating such substrates are well known to those skilled in the art. The coatings comprise the polymer compositions of the invention. Such coatings may further comprise other ingredients known to those skilled in the art. The coatings may further comprise pigments well known to those skilled in the art. The coatings may further comprise dispersing agents well known to those skilled in the art. Cobinders known to those skilled in the art may also be used. Included in such cobinders are starch, casein, soybean, protein and the like. Synthetic thickness known to those skilled in the art may also be used. The amount of each component used can easily be determined by one skilled in the art.

Preferably the components should be used in amount to result in a coated article which has good wet and dry pick properties.

SPECIFIC EMBODIMENTS

The present invention can be further illustrated by the following experiments. Unless otherwise specified, all amounts are in parts by weight and temperatures in °C.

To prepare the sample compositions evaluated in TABLE II below, the amounts of monomers as indicated in the TABLE I were fed continuously to a heated, agitated latex polymerization vessel which had been purged with nitrogen. Initially, the vessel was supplied with distilled water, Versenol 120 brand chelating agent (0.02 weight parts), and a styrene polymer latex (0.63 weight parts based on monomer) with an average particle size of 30 nanometers. Versenol is a registered trademark of The Dow Chemical Company.

Upon heating the contents to a temperature of 80° C., feed stream as needed containing tert-dodecyl mercaptan chain transfer agent (1 weight part) and the non-aqueous monomers were started and supplied over 4.5 hours. An aqueous feed stream containing 0.8 weight parts of ammonium persulfate initiator was started at the same time and supplied over 5 hours. The additional aqueous monomer feeds as needed were started at the same time or, in some cases, delayed slightly as required to provide stable and uniform particle size latex polymers. The indicated amount of the sulfoalkyl monomer is supplied in an aqueous monomer stream and the acid monomer was either added to the initial charge or supplied in a monomer feed stream.

Except where indicated in Latex Compositions E and F, the sulfoalkyl monomer was the potassium salt. In the case of SPM it was obtained in that form. In the case of SEM the acid form was obtained and neutralized with sodium or potassium hydroxide to a pH of 10 (except Latex Composition T where a pH of 7 was used). In the case of AMPS it was obtained in the acid form and neutralized with potassium hydroxide to pH 7.

During the 5 hour feeding and polymerization time the temperature of the reaction mixture was maintained at 80° C. Afterwards, the temperature was then maintained at 95° C. for a 30 minute cook-down period. At this time the solids level was about 47 percent. The latex pH was adjusted as needed with an hydroxide base to match the sulfoalkyl monomer cation (NAOH or KOH). The latexes generally had a uniform average particle size as measured by light scattering of about 0.15 micrometer.

The latex polymer Tg (glass transition temperature) is measured by a du Pont Scanning Calorimeter Type 910 with a scanning rate of 10° C. per minute. The mechanical stability was tested on a Hamilton Beach (registered tradename, Hamilton Beach Division, Scovill Mfg. Co., USA) High Speed Mixer Model No. 30. The latex was diluted to 45% solids by weight and 200 grams of prefiltered latex liquid was stirred at high speed for twenty (20) minutes. As needed, 3 to 4 drops of a silicon antifoaming agent was used, Dow Corning 1510, a registered tradename of Dow Corning, Michigan USA. After the stirring, the residue was recovered by filtration through a 325 mesh screen. The filtrate was washed with water and the remaining residue (i.e., particles greater than 45 micrometers in size) was dried using an absorbant paper and weighed. Mechanical stability is then shown by low levels of residue, which residue amounts are given in TABLE I in grams of residue per 200 grams of original latex liquids.

The following abbreviations are used in the TABLES: STY is styrene, BD is 1,3-butadiene, IA is itaconic acid, MAA is methacrylic acid, SEM is sulfoethyl(meth)acrylate SPM is sulfopropyl (meth)acrylate, AN is acrylonitrile, AAm is acrylamide and BuA is n-butylacrylate. It should be noted that, as indicated below, where the sulfoalkyl monomer is not used, the indicated amount of an additional anionic surfactant (Aerosol A102, tradename of American Cyanamid) must be used to obtain sufficient latex stability.

TABLE I

LATEX COMPOSITIONS

| | COMPOSITION | | | | | | |
|---|---|---|---|---|---|---|---|
| | A* | B* | C | D | E* | F | G* |
| MONOMERS | | | | | | | |
| STY | 68.5 | 68.5 | 67.5 | 66.5 | 68.5 | 67.5 | 66.5 |
| BD | 30.5 | 30.5 | 30.5 | 30.5 | 30.5 | 30.5 | 30.5 |
| IA | 1 | — | 1 | 1 | 1 | 1 | — |
| MAA | — | — | — | — | — | — | 3 |
| ULFO | 0** | | | | 0** | | 0** |
| SEM | — | 1 | 1 | 2 | — | 1 | — |
| SPM | — | — | — | — | — | — | — |
| AMPS | — | — | — | — | — | — | — |
| CATION | K | K | K | K | Na | Na | K |
| OTHER | | | | | | | |
| AN | — | — | — | — | — | — | — |
| AAm | — | — | — | — | — | — | — |
| BuA | — | — | — | — | — | — | — |
| Tg °C. | 21 | 21.5 | 24 | 24 | 25 | 23 | 25 |
| LATEX STABILITY | | | | | | | |
| pH 4.4 | 56 | 0.2 | 0.3 | | | | |
| pH 6 | 0.1 | — | 0.1 | | | | |
| pH 8.4 | — | 0.2 | — | | | | |

| | COMPOSITION | | | | | |
|---|---|---|---|---|---|---|
| | H | I* | J* | K | L | M |
| MONOMERS | | | | | | |
| STY | 65.5 | 61.5 | 76.5 | 60.5 | 75.5 | 61.5 |
| BD | 30.5 | 37.5 | 22.6 | 37.5 | 22.6 | 31.5 |
| IA | — | 1 | 1 | 1 | 1 | 1 |
| MAA | 3 | — | — | — | — | — |
| ULFO | | 0** | 0** | | | |
| SEM | 1 | — | — | 1 | 1 | 1 |
| SPM | — | — | — | — | — | — |
| AMPS | — | — | — | — | — | — |
| CATION | K | K | K | K | K | K |
| OTHER | | | | | | |
| AN | — | — | — | — | — | 5 |

TABLE I-continued

| LATEX COMPOSITIONS | | | | | | |
|---|---|---|---|---|---|---|
| AAm | — | — | — | — | — | — |
| BuA | — | — | — | — | — | — |
| Tg °C. | 29 | 8.2 | 40 | 4 | 40 | 25 |

| | COMPOSITION | | | | | | |
|---|---|---|---|---|---|---|---|
| | N | O | P | Q | R | S | T |
| MONOMERS | | | | | | | |
| STY | 66 | 67 | 60 | 67.5 | 67.5 | 68 | 67.5 |
| BD | 30.5 | 26 | 31.5 | 30.5 | 30.5 | 30.5 | 30.5 |
| IA | 1 | 1 | 1 | 1 | 1 | 1 | 1 |
| MAA | — | — | — | — | — | — | — |
| ULFO | | | | | | | |
| SEM | 1 | 1 | 1 | — | — | 0.5 | 1 |
| SPM | — | — | — | — | 1 | — | — |
| AMPS | — | — | — | 1 | — | — | — |
| CATION | K | K | K | K | K | K | K |
| OTHER | | | | | | | |
| AN | — | — | 5 | — | — | — | — |
| AAm | 1.5 | — | 1.5 | — | — | — | — |
| BuA | — | 5 | — | — | — | — | — |
| Tg °C. | 21 | 26 | 26 | 22 | 26 | 23 | 23 |

*Comparative experiment, not an example of the present invention.
**In order to achieve sufficient stability 1 weight part of Aerosol A102 anionic surfactant is used in the polymerisation.

As can be seen in comparing Latex Compositions A*, B* and C above, the sulfoalkyl monomer provides the latex with improved mechanical stability over a range of latex pH values.

To illustrate the suitability of the polymer compositions prepared according to the present invention for paper coating applications, two paper coating pigment compositions were prepared. Pigment A comprised 100 parts of SPS clay (commercially available from and a trademark of English China Clay, U.K.) dispersed in a slightly alkali aqueous solution of 0.1 weight parts sodium polyacrylate and 0.2 weight parts sodium methaphosphate as dispersants. Pigment B was prepared similarly using 50 parts of the same clay and the same amounts and types of dispersants in combination with 50 parts by weight of a calcium carbonate slurry commercially available as Hydrocarb 90 (trademark) from Pluess Stauffer, Switzerland.

To these pigment compositions were added 1.0 part by weight solids of a carboxy methyl cellulose (cmc) thickener commercially available as FFS (trademark) from Metsa Serla Chemical Division, Finland, 0.5 parts by weight solids URECOLL S (trademark) urea formaldehyde cross-linking agerit commercially available from B.A.S.F, West Germany and 10 parts by weight latex solids of a latex polymer of the indicated composition. The pH was adjusted to 8.5 by the addition of sodium hydroxide. The resulting paper coating formulations then contained 61 percent by weight solids and had a viscosity of approximately 1,200 millipascal seconds (Pigment A) or contained 64 percent by weight solids and had a viscosity of approximately 1,600 millipascal seconds (Pigment B) as measured by a Brookfield viscometer RVT at a speed of 100 rpm.

Each of the formulations was coated onto an 84 gram per square meter wood-free base paper of the indicated Base Paper Lot using a conventional blade coating technique to produce a coating weight of 12 grams per square meter (dry coating weight). The paper was then passed 5 times through a calender using nip rollers at a temperature of 600C and a pressure of 100 kilonewtons per meter.

The wet and dry pick resistances of these coated papers were then tested. The standardized TAPPI test method was used to determine dry pick resistance by measuring the distance along the printed surface (maximum pendulum speed) until picking occurred, higher numbers indicating better coatings. Medium oil ink and a pendulum drive were used.

The wet pick resistance was measured by the "Old" wet pick resistance test using a standard Prüfbau testing apparatus and a standard Lorilleux ink (3800) by the following test procedure. First water was applied in the middle of the strip and the edges remained dry. This was then printed with ink after a two second delay. This procedure was carried out at a set speed and the strip was then examined for wet pick in the middle area. The speed of printing was then varied and further strips used until the speed at which wet pick starts was defined. The higher the speed for the start of wet pick, the better is the wet pick resistance of the coated paper by this test.

The wet pick resistance was measured also by a modified version of the standard wet pick test, referred to herein as the "New" wet pick test, using a standard Prüfbau testing apparatus and standard Hüber inks under the following testing procedure. Two standard paper test strips were used. On the first a strip of water was applied to the middle (area B) and the edges (area A) remained dry. This was then printed with ink on the Prüfbau apparatus. The wetted portion, area B, had less ink density due not only to the fact that parts of the water-weakened coating "picked" off but also due to the fact that the wetted paper partially refused the ink compared to the dry paper. Immediately after the first strip was printed, the second, completely dry test strip was printed on the PrUfbau apparatus in the same way without drying, cleaning or re-inking the printing surface.

The ink density in the second strip was different at the edges (area C) than in the middle (area D). This is because, compared to the printing of the edges, the printing surface which contacted the second strip in the middle area D, after printing the first, partially wetted strip still had (a) portions of wet-picked coating removed from area B, (b) water that was removed from printing area B, and also (c) extra ink which was refused when area B was printed. The ink density was measured by standard reflected light intensity means and average density values were obtained for areas A, B, C and D. These values were then used in the following relationships to calculate the value for wet pick resistance:

X (ink transfer in %)=(B/A)×100
Y (ink refusal in %)={[100D−(X×C)]/100A}×100
Z (wet pick in %)=100−X−Y As can be seen from these equations, a high value for X indicates good printability, a low value for Y indicates low levels of ink refusal and low values of Z indicate good wet pick resistance by this test. The results of these tests on the papers coated with the various coating color formulations are shown below in the following TABLE.

As indicated in the TABLE below, the polymer compositions according to the present invention provide very desirable paper coating compositions. As can be seen, the sulfoalkyl monomer produces surprisingly good combinations of wet and dry pick resistance.

In TABLE I above, the Latex Compositions indicated identify a particular latex recipe. In the following TABLE II paper coating formulations are prepared using such latexes and, in a series of Comparisons, used to illustrate the effects or trends resulting in the coating properties due to the differing latex recipes. For each of these Comparisons the Base Paper Lot is indicated and the coating formulations and coated papers were prepared at the same time in order to provide a valid illustration of the properties of each latex. However, it is well known that paper coating formulations prepared and/or coated onto paper at different times are not directly comparable. This can be due to a number of small factors such as differing raw material batches, different base paper lots, humidity, coating apparatus operations, etc. For this reason a particular coating formulation cannot be expected to give exactly the same results when tested at two different times or on different base paper lots, as illustrated by Latex Compostion A* in Comparisons 1, 2 and 7 in TABLE II below. In addition, different Hüber inks were sometimes used for different comparisons, but within each comparison a single Hüber ink was used. Therefore, coating formulation results from a particular Comparison in TABLE II cannot necessarily be compared directly with the results from a different Comparison; only results within each Comparisons can be directly compared.

of properties. In Comparison Nos. 3 and 4 latexes were prepared having higher and lower Tg's and the balance of paper coating properties is again shown to be maintained or improved. In Comparison No. 5 the combination of SEM and methacrylic acid is shown to be similarly effective for use in the compositions according to the present invention, providing improved dry and wet pick resistance.

Comparison No. 6 shows that the use of an alternative sulfoalkyl monomer (SPM) or a lower sulfoalkyl monomer concentration also improve wet and dry pick resistance. In Comparison No. 7 it is shown that additional modifying comonomers can be used in the latex compositions according to the present invention to also obtain beneficial combinations of paper coating properties. In Comparison No. 8 the maintenance or improvement of base latex properties is shown to also apply when the sulfoalkyl monomer cation is sodium. In Comparison No. 9 it is observed that neutralization pH of the sulfoalkyl monomer can affect the paper coating properties.

It can therefore be seen above that the use of a sulfoalkyl monomer, in combination with an acid monomer,

TABLE II

PAPER COATING TESTS

| Comparison | | | PIGMENT A | | | PIGMENT B | | |
|---|---|---|---|---|---|---|---|---|
| | | | Dry | Wet Pick | | Dry | Wet Pick | |
| No. Paper | Base Lot | Latex Comp. | Pick cm/s | Old (m/s) | New (%) | Pick cm/s | Old (m/s) | New (%) |
| 1. | (A) | A* 20 Tg, IA | 69 | 1.6 | 36 | 69 | 1.9 | 8 |
| | | C* SEM, IA | 77 | 1.8 | 10 | 83 | 2.3 | 2 |
| | | Q AMPS, IA | 70 | 1.8 | 16 | 78 | 2.1 | 1 |
| 1A. | (D) | B* SEM | 78 | 2.0 | 67 | 85 | 2.4 | 29 |
| | | C IA, SEM | 82 | 3.0 | 23 | 101 | 3.2 | 2 |
| | | H MAA, SEM | 99 | 3.4 | 21 | 106 | 3.5 | 0 |
| 2. | (B) | A* 20 Tg, IA | 83 | 1.7 | 41 | 91 | 2.2 | 44 |
| | | D IA, 2 SEM | 99 | 2.0 | 23 | 88 | 2.2 | 21 |
| 3. | (B) | I* 5 Tg, IA | 101 | 1.7 | 52 | 42 | 0.9 | 91 |
| | | K IA, SEM | 105 | 1.9 | 43 | 98 | 2.0 | 65 |
| 4. | (C) | J* 40 Tg, IA | 55 | 0.6 | 73 | 60 | 0.5 | 90 |
| | | L IA, SEM | 57 | 0.7 | 61 | 65 | 0.7 | 94 |
| 5. | (C) | G* MAA | 69 | 0.9 | 41 | 79 | 1.3 | 28 |
| | | H SEM | 90 | 1.4 | 7 | 85 | 1.7 | 1 |
| 6. | (B) | A* 20 Tg | 83 | 1.7 | 41 | 91 | 2.2 | 44 |
| | | R 1 SPM | 102 | 2.1 | 5 | 99 | 2.5 | 10 |
| | | S .5 SEM | 86 | 2.2 | 8 | 108 | 2.3 | 15 |
| 7. | (C) | A* 20 Tg | 71 | 1.3 | 20 | 81 | 1.3 | 10 |
| | | M 5pt AN | 98 | 1.6 | 5 | 109 | 1.9 | 3 |
| | | N 1.5pt AAm | 84 | 1.4 | 7 | 78 | 1.4 | 11 |
| | | O 5pt BuA | 73 | 1.2 | 13 | 73 | 1.3 | 31 |
| | | P AN + AAm | 102 | 1.6 | 1 | 100 | 1.9 | 4 |
| 8. | (B) | E* Na + | 96 | 1.7 | 57 | 97 | 2.3 | 47 |
| | | F Na + SEM | 98 | 1.8 | 37 | 98 | 2.3 | 43 |
| 9. | (B) | C SEM pH10 | 90 | 1.1 | 64 | 106 | 1.5 | 85 |
| | | T SEM pH7 | 94 | 2.2 | 2 | 89 | 2.4 | 4 |

*Comparative experiment, not an example of the present invention.

It should be noted that latex and pigment stabilities in the compositions according to the present invention were surprisingly maintained even though no emulsifier addition was included. It can further be seen in Comparison No. 1 in TABLE II above, the addition of one part sulfoalkyl monomer (SEM or AMPS) to the comparative Latex Composition provides paper coating formulations which have maintained or improved dry pick resistance while having significantly improved wet pick resistance. In Comparison No. 1A it is shown that without an acid monomer, the sulfoalkyl monomer by itself does not provide paper coating property combinations that are as good as those obtained when an acid monomer (IA or MAA) is used. In Comparison No. 2 it is shown that two parts of the sulfoalkyl monomer (sulfoethyl methacrylate) similarly improves the combination provides monovinylidene aromatic/conjugated diene latex polymers with an improved balance of properties in paper coating applications. Variations in this improved latex composition, such as with differing sulfoalkyl monomers or additional modifying monomers, can be used to provide specifically desired property combinations.

We claim:

1. A monovinylidene aromatic and conjugated diene copolymer composition comprising in polymerized form:
   (a) from 40 to 80 parts by weight styrene,
   (b) from 15 to 55 parts by weight 1,3-butadiene, (c) from 0.5 to 10 parts by weight of at least one ethylenically unsaturated carboxylic acid monomer and (d) from 0.3 to 3 parts by weight of at least one sulfoalkyl surfactant monomer of the formula I:

$$H_2C=C(R_1)-A-R_2-SO_3-M \qquad I$$

wherein A is a bivalent radical of formula Ia or Ib:

$$-C(O)-NH- \qquad Ia$$

or, $$-C(O)-O- \qquad Ib,$$

Ar is phenyl or phenyl substituted with one or more of a halogen, or a hydrocarbyl radical having 1 to 4 carbon atoms;

$R_1$ is —H or a methyl radical, $R_2$ is a bivalent hydrocarbyl radical having 1 to 5 carbon atoms, $R_3$ is —H or a 1 to 4 carbon alkyl group, and M is a salt-forming cation, said weight parts being based on 100 weight parts (a), (b), (c) and (d).

2. The copolymer composition according to claim 1 in the form of an aqueous latex dispersion.

3. The copolymer composition according to claim 2 wherein component (d) is sulfoethyl methacrylate (SEM), sulfopropyl methacrylate (SPM) or 2-acrylamido-2-methylpropanesulphonic acid (AMPS).

4. The copolymer composition according to claim 1 above wherein A in formula I is represented by formula Ib.

5. A paper coating formulation comprising a copolymer composition according to claim 1.

* * * * *